US010907722B2

(12) United States Patent
Besser et al.

(10) Patent No.: US 10,907,722 B2
(45) Date of Patent: Feb. 2, 2021

(54) ACTUATOR DIAGNOSTICS AND PROGNOSTICS

(71) Applicant: Tolomatic, Inc., Hamel, MN (US)

(72) Inventors: Steven Besser, Montrose, MN (US); Gary W. Rosengren, Brooklyn Park, MN (US); Patrick Hobart, New Hope, MN (US); Robert Shulz, Excelsior, MN (US); Steven Di Marco, Chanhassen, MN (US); Aaron Dietrich, Rogers, MN (US)

(73) Assignee: Tolomatic, Inc., Hamel, MN (US)

( * ) Notice: Subject to any disclaimer, the term of this patent is extended or adjusted under 35 U.S.C. 154(b) by 317 days.

(21) Appl. No.: 15/760,131

(22) PCT Filed: Sep. 14, 2016

(86) PCT No.: PCT/US2016/051647
§ 371 (c)(1),
(2) Date: Mar. 14, 2018

(87) PCT Pub. No.: WO2017/048788
PCT Pub. Date: Mar. 23, 2017

(65) Prior Publication Data
US 2019/0048988 A1  Feb. 14, 2019

Related U.S. Application Data

(60) Provisional application No. 62/218,222, filed on Sep. 14, 2015.

(51) Int. Cl.
*F16H 57/01* (2012.01)
*F16H 25/20* (2006.01)
(Continued)

(52) U.S. Cl.
CPC ......... *F16H 57/01* (2013.01); *F16H 19/0622* (2013.01); *F16H 25/2015* (2013.01);
(Continued)

(58) Field of Classification Search
CPC ............... B23K 11/311; F16C 2233/00; F16H 19/0622; F16H 2019/0686;
(Continued)

(56) References Cited

U.S. PATENT DOCUMENTS 4,525,763 A * 6/1985 Hardy .................. G01R 31/343
                                                       318/472
5,945,011 A   8/1999 Takano et al.
(Continued)

FOREIGN PATENT DOCUMENTS

CN           1782444 A       6/2006
CN         100370387 C       2/2008
(Continued)

OTHER PUBLICATIONS

International Search Report and Written Opinion dated Jan. 3, 2017 in connection with International Patent Application No. PCT/US2016/051647, 11 pages.
(Continued)

*Primary Examiner* — Dale Moyer
(74) *Attorney, Agent, or Firm* — Dorsey & Whitney LLP

(57) ABSTRACT

A system (10, 14) includes one or more sensors configured for acquiring data related to operational conditions of a motor actuator (12), a processor (62) configured for analyzing the data to determine a status of the motor actuator (12), and memory (64) for storing data representative of the operational conditions. A status indicator is generated based on the analysis of the operational conditions, for example to represent system capabilities, normal operating modes, and failure modes of the motor actuator (12). The system (10,
(Continued)

14) can be configured to communicate the status indicator to a user interface (21, 66) or higher-level controller (20, 22).

22 Claims, 6 Drawing Sheets

(51) Int. Cl.
    *H02K 7/06*           (2006.01)
    *H02K 11/35*         (2016.01)
    *F16H 19/06*         (2006.01)

(52) U.S. Cl.
    CPC .............. *H02K 7/06* (2013.01); *H02K 11/35* (2016.01); *F16H 2019/0686* (2013.01); *F16H 2025/2075* (2013.01)

(58) Field of Classification Search
    CPC ......... F16H 2025/2075; F16H 25/2015; F16H 57/01; G01M 13/045; H02K 11/35; H02K 7/06
    See application file for complete search history.

(56) References Cited

U.S. PATENT DOCUMENTS

| | | | |
|---|---|---|---|
| 6,041,287 A | 3/2000 | Dister et al. | |
| 6,055,461 A | 4/2000 | Sumiyama et al. | |
| 6,274,840 B1 | 8/2001 | Kanjo | |
| 6,313,427 B1 | 11/2001 | Suita | |
| 6,531,674 B2 | 3/2003 | Suita | |
| 6,828,522 B2 | 12/2004 | Hochhalter et al. | |
| 6,834,256 B2 | 12/2004 | House et al. | |
| 6,888,089 B2 | 5/2005 | Okanda et al. | |
| 7,002,095 B2 | 2/2006 | Kato et al. | |
| 7,039,474 B2 | 5/2006 | Bonnain et al. | |
| 7,124,057 B2 | 10/2006 | Förster et al. | |
| 7,254,514 B2 | 8/2007 | House et al. | |
| 7,301,117 B2 | 11/2007 | Wiedemann et al. | |
| 7,412,323 B2 | 8/2008 | Tanaka et al. | |
| 7,574,324 B2 | 8/2009 | Ueno | |
| 7,801,701 B2 | 9/2010 | Mayer | |
| 8,121,818 B2 | 2/2012 | Gorinevsky | |
| 8,504,307 B2 | 8/2013 | Norihisa | |
| 8,594,852 B2 | 11/2013 | Alstrin et al. | |
| 8,838,413 B2 | 9/2014 | Genta | |
| 9,020,642 B2 | 4/2015 | Inazumi | |
| 9,457,438 B2 | 10/2016 | Abdallah et al. | |
| 9,463,573 B2 | 10/2016 | Inazumi | |
| 2004/0074877 A1* | 4/2004 | Hochhalter .......... | B23K 11/253 219/86.41 |
| 2004/0162704 A1* | 8/2004 | Siegel .................. | G05B 19/406 702/183 |
| 2004/0249520 A1 | 12/2004 | Maine | |
| 2005/0043923 A1* | 2/2005 | Forster ................. | F15B 19/005 702/184 |
| 2005/0255186 A1* | 11/2005 | Hiraga ................... | B29C 45/83 425/542 |
| 2006/0036402 A1* | 2/2006 | Deller ................... | F15B 19/005 702/183 |
| 2006/0060078 A1 | 3/2006 | Deller et al. | |
| 2006/0113940 A1 | 6/2006 | Nagai et al. | |
| 2006/0171625 A1* | 8/2006 | Jones .................. | G01M 13/045 384/624 |
| 2006/0259271 A1* | 11/2006 | House ................ | G05B 23/0248 702/181 |
| 2008/0065354 A1* | 3/2008 | Yoshioka ................ | F16C 29/00 702/183 |
| 2009/0171594 A1* | 7/2009 | Norihisa ........... | G05B 19/4065 702/34 |
| 2012/0290261 A1* | 11/2012 | Genta .................... | G05B 23/00 702/179 |
| 2013/0013138 A1* | 1/2013 | Lu ......................... | B60L 3/0061 701/22 |
| 2015/0295468 A1* | 10/2015 | Pizzoni .................. | F16H 25/20 310/80 |
| 2016/0132050 A1* | 5/2016 | Heller ................ | G05B 23/0224 702/34 |
| 2016/0144508 A1 | 5/2016 | Nakajima | |
| 2016/0311111 A1 | 10/2016 | Ogawara | |
| 2017/0069145 A1* | 3/2017 | Dorkel ................. | G07C 5/0808 |
| 2019/0107824 A1* | 4/2019 | Oohara .............. | G05B 19/4065 |

FOREIGN PATENT DOCUMENTS

| | | |
|---|---|---|
| CN | 101943911 A | 1/2011 |
| CN | 101965140 A | 2/2011 |
| CN | 103331310 A | 10/2013 |
| CN | 104626168 A | 5/2015 |
| CN | 105252539 A | 1/2016 |
| DE | 102010050837 A1 | 5/2012 |
| EP | 1595681 A1 | 11/2005 |
| JP | 2000141262 A | 5/2000 |
| JP | 2005201390 A | 7/2005 |
| JP | 2011042022 A | 3/2011 |
| JP | 2014006566 A | 1/2014 |
| JP | 2015143969 A | 8/2015 |
| WO | 2008065354 A1 | 6/2008 |

OTHER PUBLICATIONS

Examination Report dated Sep. 15, 2020 in connection with European Patent Application No. 16770427.9, 6 pages.

First Office Action dated Sep. 2, 2020 in connetion with Chinese patent application No. 2016800530630, 19 pages including English translation.

* cited by examiner

ACTUATOR DIAGNOSTICS AND PROGNOSTICS

CROSS-REFERENCE TO RELATED APPLICATION

This application claims priority under 35 U.S.C. 371 to International Patent Application No. PCT/US2016/051647, filed Sep. 14, 2016, entitled "ACTUATOR DIAGNOSTICS AND PROGNOSTICS", which claims priority to U.S. Provisional Application Serial No. 62/218,222, ACTUATOR DIAGNOSTICS AND PROGNOSTICS, filed Sep. 14, 2015, each of which is incorporated by reference herein, in the entirety and for all purposes.

BACKGROUND

This application relates to actuator systems, and more generally to actuator diagnostics and prognostics. In particular, the application is directed to advanced diagnostic and prognostic techniques for automated actuator systems, including, but not limited to, actuators used in welding, manufacturing, and other industrial processes.

Actuator systems include both linear and rotary designs, with different drive mechanisms including electric motors, rotary screws, belt drives, and pneumatic cylinders. Rod-style actuators include short-stroke screw-driven devices for use in welding, machining, and other manufacturing processes. Screw-driven actuators can also be configured for increased loading and extension, while pneumatic cylinders and rodless (e.g., rail and carriage) systems are commonly used where speed, stroke length and space savings are design considerations.

Actuator weight, size, and system complexity are typically among the major design considerations. Reliability and service life are also important factors, particularly in robotic welding and other large-scale industrial applications, where unscheduled maintenance and downtime can result in substantial lost productivity and associated costs. As a result, there is a continuing demand for more advanced actuator diagnostic and prognostic techniques, which have not been met by the prior art.

SUMMARY

This application is directed to a monitor for a motor actuator. The monitor is configured to perform actuator diagnostics and prognostics by analyzing sensor data to generate system status and health indicators, using sensor data stored in memory and executed in an on-board computing device or processor. The sensors provide data that characterizes actuator components with known system capabilities, normal operating modes, and system failure modes. The monitor is configured to communicate the current status and health of the integrated motor actuator to a higher-level monitor, for example the actuator controller or a user interface. The data can also be translated to a lower-level maintenance controller.

A motor actuator system utilizing such a monitor includes a motor configured to drive a screw shaft and nut assembly into relative rotation about an axis. A thrust rod is coupled to the nut assembly, with the thrust rod configured to execute reciprocal motion along the axis in response to the relative rotation of the screw shaft and nut assembly. One or more sensors can be configured to acquire sensor data characterizing operational conditions of the motor actuator. Memory is configured for storing model data representative of the operational conditions, e.g., for normal operating modes and failure modes of the motor actuator system. A processor is configured to generate a status indicator based on analysis of the operational conditions, which are characterized by the sensor data, with respect to the model data. An interface is configured to communicate the status indicator to a control device configured or adapted for operating the motor actuator.

DETAILED DESCRIPTION

Figure 1:
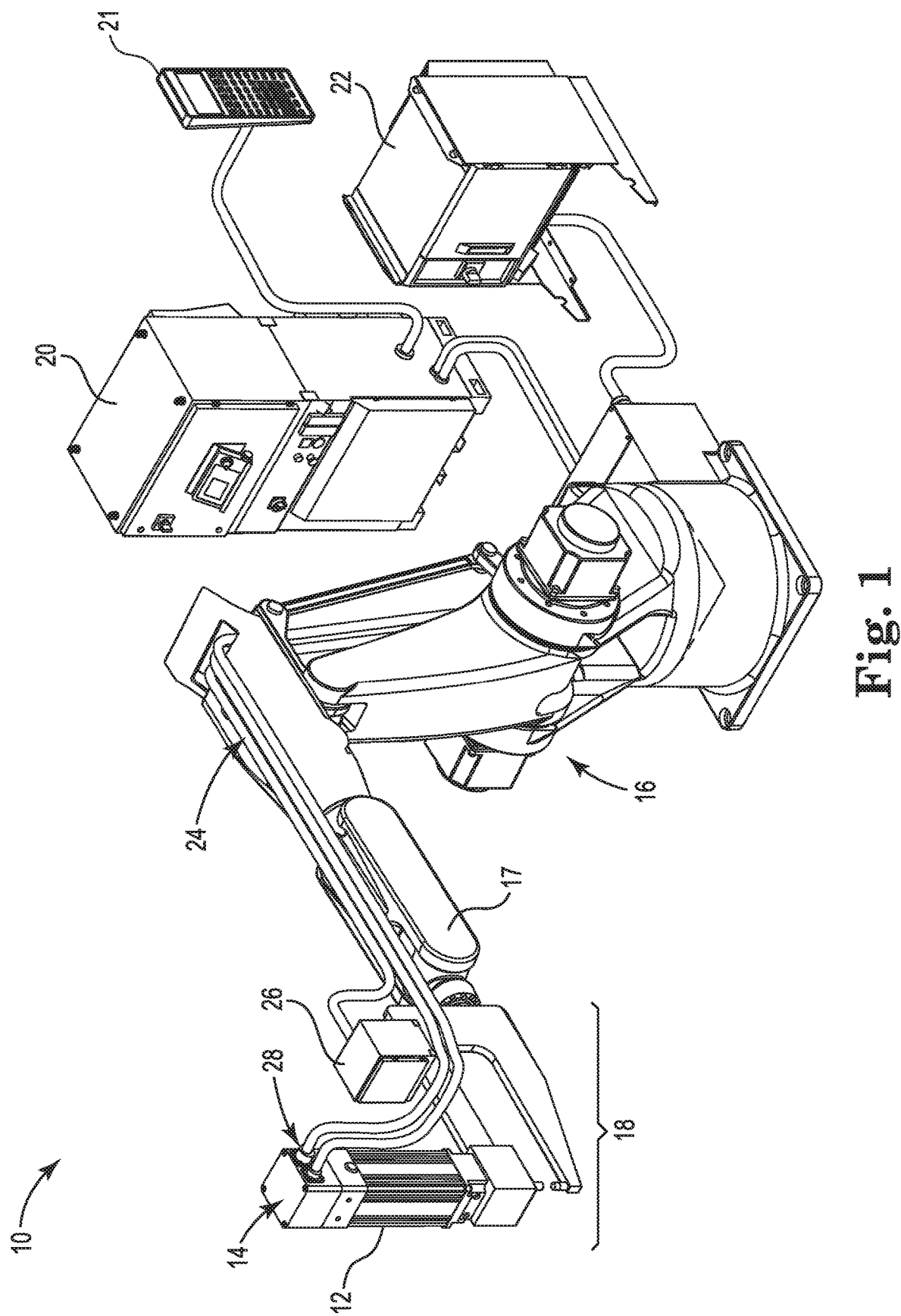
FIG. 1 is a schematic view of a robotic actuator system with diagnostic monitoring.

FIG. 1 is a schematic view of robotic actuator system 10, including an (e.g., linear) actuator 12 with external diagnostic monitor 14. In this particular example, linear actuator 12 is configured for use in an automated machine operation such as robotic welding, or other industrial task. Monitor system 14 is configured to perform advanced diagnostic and prognostic functions for actuator 12, including generating health status and predictive indicators adapted to reduce downtime and unscheduled maintenance, as described herein.

Diagnostic monitor 14 can be mounted to or enclosed within the protective housing of actuator 12, or provided or elsewhere on robot apparatus 16. For example, monitor 14 may be integrated with a "7$^{th}$ axis" feedback device or other feedback/control subsystem mounted to or enclosed within the actuator housing, as shown in FIG. 1. Alternatively, monitor 14 can be provided as an independent module or hardware package, with connections to an external user interface or higher-level controller. Monitor 14 can also be integrated with the robot controller, for example with a 7$^{th}$ axis control system provided inside the robot controller, and configured to allow the robot controller to control and communicate with actuator 12, or in a separate actuator/effector control subsystem, as described below.

In operation of robotic system 10, robot apparatus 16 manipulates robot arm 17 to position a welding gun or other end effector 18 with respect to a workpiece, and actuator 12 is operated to execute the corresponding function (e.g., a welding operation in an automotive assembly process, or other industrial task). As shown in FIG. 1, robotic system 10 includes a robot controller 20 with a teach pendant or other manual interface 21, adapted for programming and controlling robot apparatus 16 to position robot arm 17 with actuator 12 and a welding gun-type effector 18. A separate controller 22 is configured to control operation of the effector, e.g., by utilizing a robot cable dress package or similar cabling 24 to operate transformer 26 on a welding gun or effector (or other machine tool component) 18, with additional connections 28 for power, motor control and feedback from actuator 12 and monitor 14, respectively.

Robotic welding and other automated machine processes have a number of advantages over manual methods, including precise positioning, consistent quality, energy savings, and adaptability to design changes and other industrial demands. In robotic welding, for example, effectiveness depends upon precise and reliable positioning of the weld tips, and suitable electric motor-driver linear actuators 12 can improve both operational speed and positioning accuracy for more consistent, high-quality welds per minute, with less burn-through and longer weld tip life.

Over the course of weeks, months and years, the components of actuator 12 and end effector 18 are exposed to wear, stress, and other operational effects. Routine maintenance can be scheduled to replace weld tips and other wear components, but more advanced monitoring may be necessary to address other, less predictable service requirements, particularly where operating conditions may vary substantially among different applications.

To address these concerns, monitor 14 can be utilized to provide advanced diagnostic and prognostic functions, including adaptive and predictive capabilities for a range of different operational conditions and potential failure modes. With suitable sensor placement, these functions can be utilized to increase the useful service life of actuator 12, reducing downtime and unanticipated maintenance requirements for robotic system 10.

Figure 2:
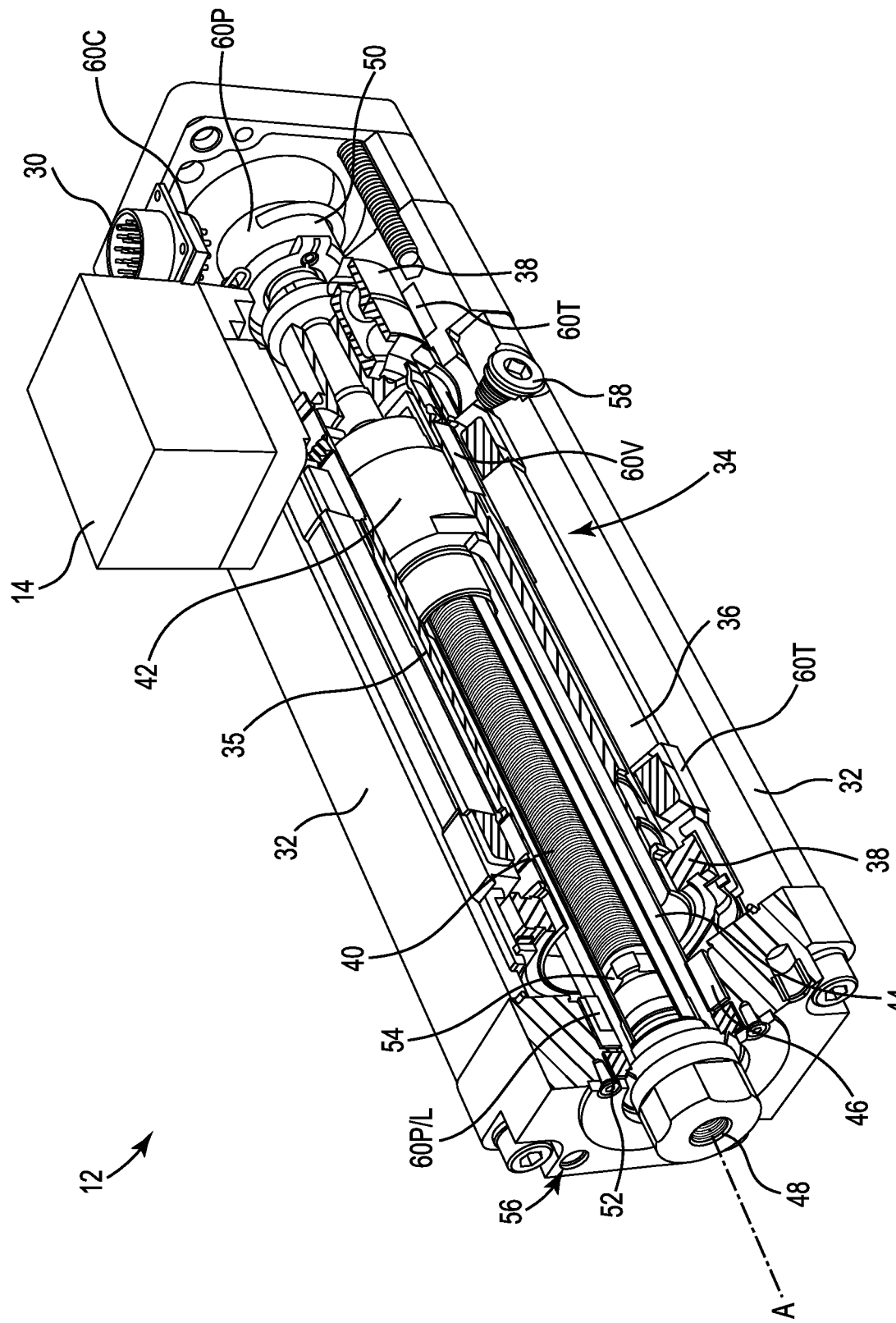
FIG. 2 is a cutaway view of an actuator system with an external diagnostic monitor package.

FIG. 2 is a cutaway view of an actuator system 12 with an external monitor (or monitor package) 14. In this particular example, monitor 14 is mounted to actuator housing 32, over one or more connectors 30. Alternatively, monitor 14 can be mounted to the robot arm or integrated into another control or feedback system, for example as a hardware or software module of the welding controller or other higher-order, process-level device.

As shown in FIG. 2, actuator system 12 includes monitor package 14 mounted to housing 32, with an internal motor system 34 including a hollow rotor 35, extending coaxially about screw shaft 40, proximate stators (or stator windings) 36. Rotor 35 is supported on one or more bearings 38, and rotationally coupled to the threaded screw or screw shaft 40. Stators 36 can be provided in either a segmented or skew design, depending on desired torque and repeatability characteristics of the rod tip position at the stroke end.

Nut 42 (e.g. a ball or roller nut) is coupled to thrust tube 44 at the back (distal) end, inside actuator housing 32. Thrust tube 44 is also supported on one or more end bearing or bushing elements 46, located at the front (proximal) end of housing 32. Nut 42 engages threaded screw shaft (or power screw) 40 of actuator 12 to move thrust tube 44 and rod end 48 in a linear direction, back and forth along axis A, in response to the rotation of screw shaft 40 by rotor 35. In some designs, a servo motor 34 is used to drive rotor 35 coupled to screw shaft 40 (see, e.g., FIG. 3). Alternatively, a threaded shaft 40 can be coupled to thrust tube 44, with nut 42 rotationally coupled to rotor 35 in an axially fixed location, so that the shaft 40 and thrust tube 44 move back and forth along axis A in response to the rotation of nut 42. These examples are merely representative, and other configurations are also encompassed. These include, but are not limited to, roller screw assemblies, ball screw assemblies, inverted roller screw assemblies, inverted ball screw assemblies, and other actuator configurations, as known in the art.

A high resolution digital encoder 50 is utilized to determine the rotational position of screw shaft 40, and thus to control the linear position of thrust tube 44 and rod end 48. Rod end 48 can provide a common interface for multiple applications, for example by threaded coupling to a weld cap or other working element, allowing actuator 12 to control the corresponding effector position during the welding process, or other automated industrial operation.

Depending on embodiment, a wiper or scraper element 52 may be utilized to prevent contaminants from entering actuator housing 32, and one or more internal bumpers 54 can be provided to protect the screw and nut assembly at the end of the stroke. External mount holes 56 can be configured for direct mounting of the end effector, and a manual override 58 can be used to position rotor 35 and extend or retract thrust tube 44 when actuator 12 is powered off.

Figure 6:
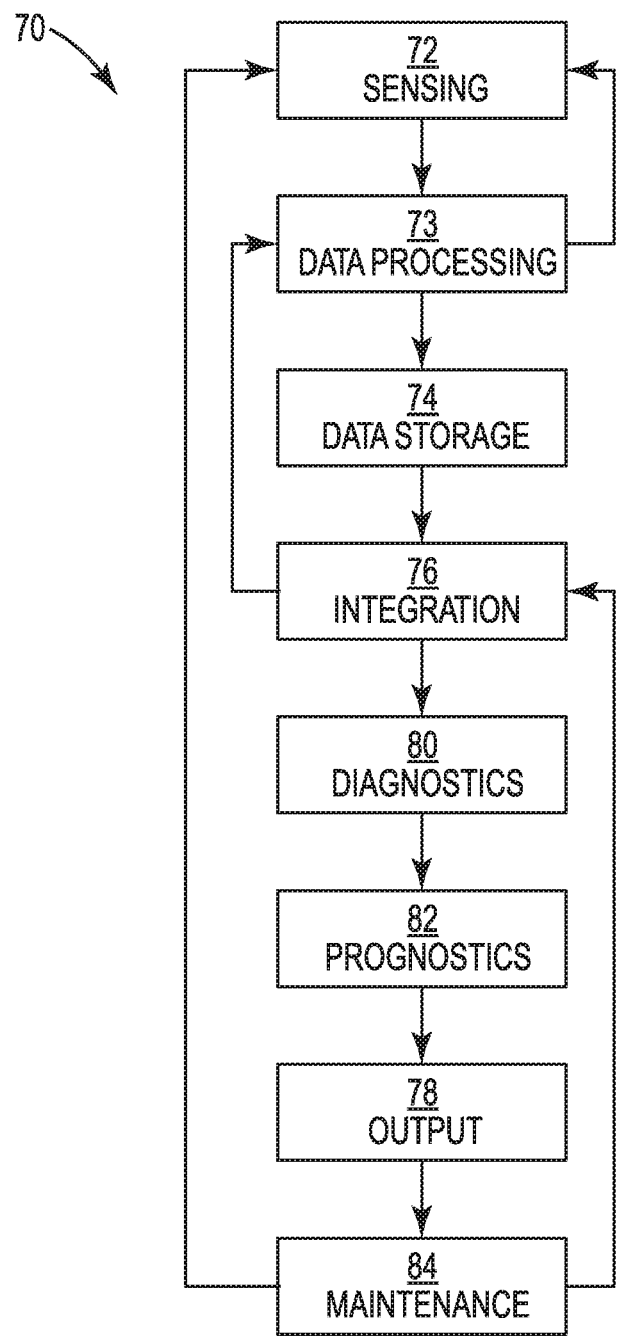
FIG. 6 is a block diagram illustrating a method for diagnostic and prognostic monitoring of the actuator system.

Monitor 14 includes a processor and various memory components coupled to one or more sensors 60T, 60C, 60V, 60P, 60L, etc., which are mounted internally or externally to actuator housing 32 and connected via sensor wires or wireless signal elements (see FIG. 6). The sensors are capable of directly or indirectly acquiring data related to the temperature and other environmental and operational parameters of actuator system 12. More particularly, the individual sensors are configured to either directly sense or generate sensor data related to the temperature and other parameters of selected actuator components, including components having a risk of substantial wear or failure over the course of long-term actuator use over a wide range of different operational conditions.

Failure or substantial wear in critical components can result in unscheduled downtime, and presents a risk of damage to the motor, nut, screw shaft and other mechanical elements of actuator 12. Temperatures and other sensor data can provide valuable information regarding the motor and actuator status, for use in generating diagnostic and prognostic indicators adapted to anticipate maintenance needs by detecting wear before the onset of failure, so that appropriate service can be scheduled before failure actually occurs.

For example, one or more temperature sensors 60T (e.g., a thermocouple, thermistor, resistance temperature detector (RTD) or infrared (IR) sensor) can be configured to sense the internal temperature of actuator system 12, for example the temperature of nut 42 proximate rear thrust bearing 38 of screw shaft 40. An IR sensor 60T or other element can also be used to determine the temperature of nut 42 at a particular stroke position. Additional temperature sensors 60T can be positioned to determine the temperature of stators 36, e.g., at the end turn of the stator windings (where the radius of curvature is relatively higher, and current-temperature effects are more evident).

One or more electrical current sensors 60C can be employed to determine the stator and corresponding torque output of rotor 35, for example using an inductive sensor coupled around the motor current supply for stator windings 36. Alternatively, a load cell 60L could be configured to directly determine the torque loading on rotor 35, or the force output of thrust tube 44. One or more positional sensors 60P (e.g., a linear encoder or transducer) can also be used to determine the linear positions of thrust tube 44 and rod end 48, either independently of, or in cooperation with, corresponding data from rotary encoder 50.

One or more accelerometers or other vibration sensors 60V can be coupled to actuator housing 32, in order to observe the frequency and amplitude of vibrations related to the operation of actuator system 12. For vibration signals, relative components include, but are not limited to, rotor 35, screw shaft 40, nut 42, and other mechanical components, from which the vibration signals can be transmitted to housing 32. Thus, vibration sensors 60V can also be mounted to the processor and memory board or other components of monitor 14, because these are mechanically coupled to nut 42 and the other internal components of actuator 12 via housing 32. Alternatively, one or more vibration sensors 60V can be coupled directly to (or adjacent) nut 42, or an optical motion sensor can be used to view the vibrational state of nut 42 at a particular stroke position.

Figure 3:
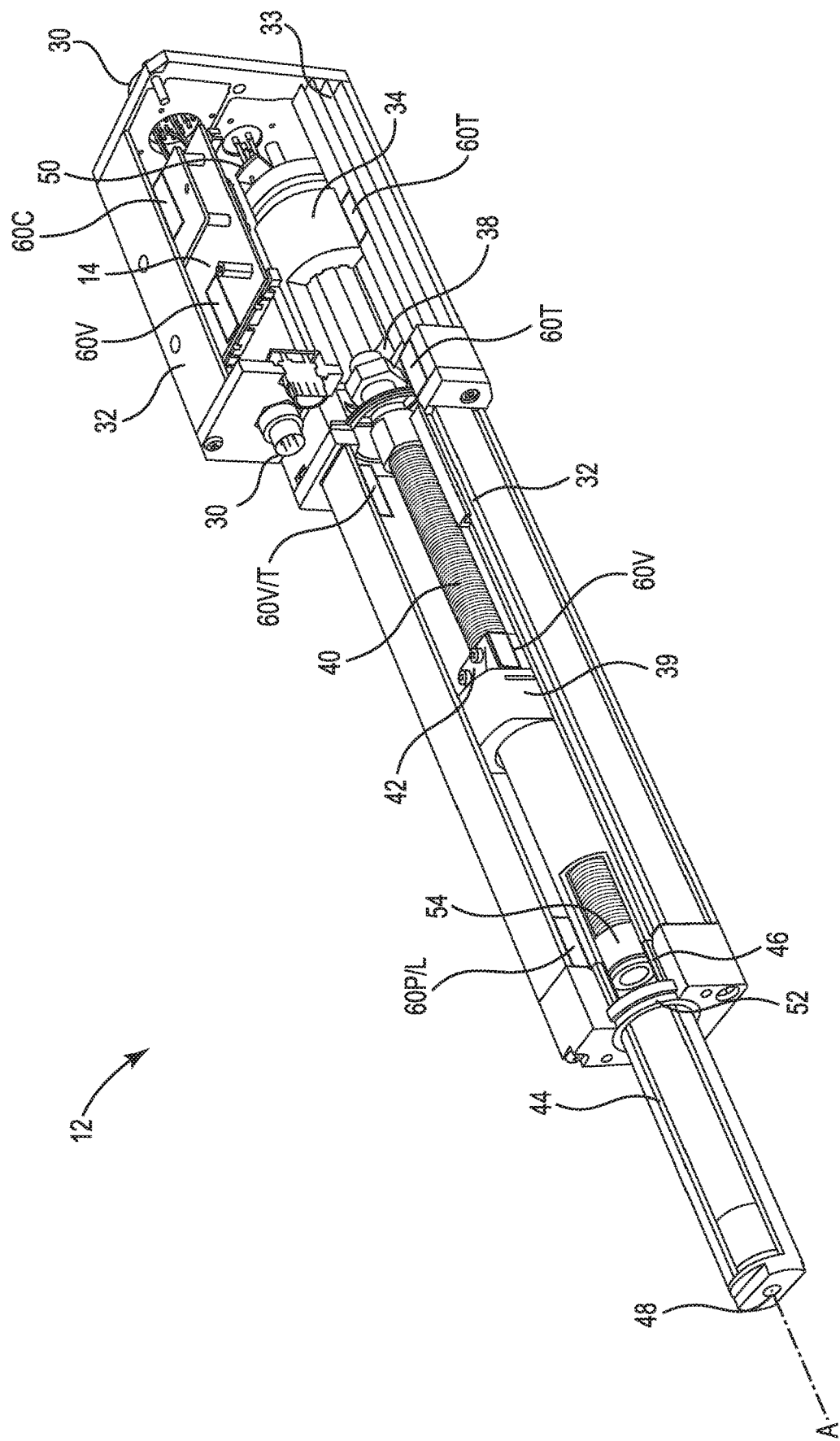
FIG. 3 is a cutaway view of the actuator system, in an integrated control rod configuration with an internal diagnostic monitor.

FIG. 3 is a cutaway view of actuator system 12, in an integrated control rod (ICR) configuration with an internal or embedded diagnostic monitor 14. In this example, an electric servo motor 34 is used to drive screw shaft 40, which is coupled to thrust tube 44 via a nut or roller screw assembly 42. An anti-rotation bearing 39 is provided to support thrust tube 44 within actuator housing 32, and to stabilize rod end 48 against rotation over the full stroke cycle.

As shown in FIG. 3, diagnostic monitor 14 is provided in an internal configuration, disposed in the back (distal) portion of actuator/motor housing 32, adjacent encoder 50 and motor 34, and opposite rod end 48 in the front (proximal) section of housing 32. Alternatively, the monitor electronics can be combined with or integrated into similar components of digital encoder 50, or provided as a separate monitor hardware package or software module, as described herein. In addition to its diagnostic and prognostics capabilities, integrated embodiments of monitor 14 can also be configured to provide digital drive system operability, with advanced indexer programming for encoder 50 and daisy-chained control capabilities via additional connectors 30.

Suitable servo motors and other motor systems 34 can be operated at substantially 100% duty cycle for high-demand applications, with internal thermal protection and fins 33 or similar features to dissipate heat from housing 32. Depending upon application, motor 34 can be mounted in either an in-line or coaxial configuration; that is, directly coupled to screw shaft 40 along rotational axis A as shown in FIG. 3, using an oversized rear thrust bearing 38 to support the screw shaft (or leadscrew) 40 at the front end of motor 34. Alternatively, motor 34 can be mounted in a parallel or reverse-parallel configuration, using a belt drive to couple motor 34 to the screw shaft, and reducing the overall length of actuator system 12 and housing 32.

Depending upon design, one or more vibration sensors 60V (e.g., accelerometers or acoustic frequency sensors) can be provided on or near roller screw assembly 42, or mechanically coupled to actuator housing 32 (e.g., mounted on one or more electronics boards for monitor 14). Similarly, thermal sensors 60T can be provided proximate one or both of rear bearing 38 and motor 34, and an IR sensor 60T or optical/acoustic motion sensor 60V can be provided to sample the temperature and vibrational state of roller screw/nut assembly 42. Additional positional and load sensors 60P/L can be used to directly determine the stroke position and force or torque output, or these can be derived from current sensors 60C and encoder 50, as described above.

Figure 4:
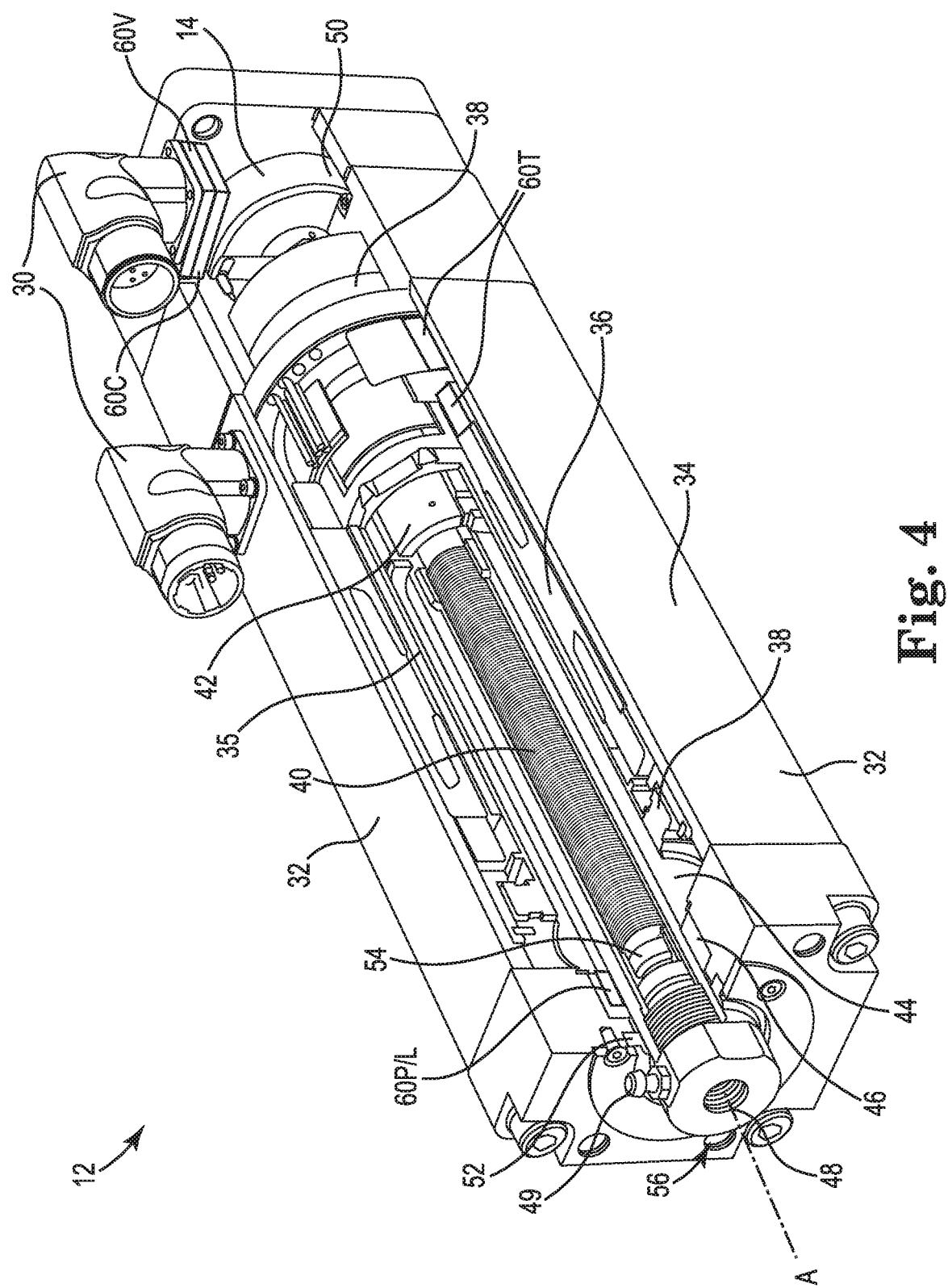
FIG. 4 is a cutaway view of the actuator system, in an integrated motor actuator configuration with an integrated encoder and diagnostic monitor package.

FIG. 4 is a cutaway view of actuator system 12, in an integrated motor actuator (IMA) configuration with combined encoder 50 and diagnostic monitor 14. In this configuration, encoder 50 and diagnostic monitor 14 are embedded in the back end of actuator housing 32, and may share processor and memory components.

Motor section 34 includes open rotor 35 extending about screw shaft 40, driven by electromagnetic interaction with stators 36. A replaceable rod wiper 52 is provided at the front end of housing 32, with a screw lubrication port 49 located near rod end 48 in order lubricate the internal components of actuator 12 without requiring disassembly of housing 32.

Depending upon application, one or more vibrational sensors 60V can be coupled to housing 32 to sample the vibrational signatures transmitted by nut 42, shaft 40, and the other mechanical components of actuator 12, for example along with a current sensor 60C positioned to sense the drive current at connector 30. Thermal sensors 60T can also be provided near the rear thrust bearing 38 or at the end turn locations in stators 36, as shown in FIG. 4. Position and load cell sensors 60P and 60L can be provided to determine the thrust tube position and torque or force loading, as described above.

In the internal configuration of FIG. 4, monitor 14 is mounted inside actuator housing 32 to perform diagnostics and prognostics by analyzing data from sensors 60T, 60C, 60V, 60P, 60L, etc., generating system status and health information using indicators generated by monitor software executed in an on-board computing device or processor. The monitor software executed algorithms providing additional application data stored in memory by monitor 14, representing known system capabilities, operating parameters, and normal and abnormal (e.g., system failure) modes. Monitor 14 can also be configured to communicate operational status and health data to or user interface or the actuator controller, or to another higher-level system such as the robot controller.

In some designs, monitor 14 is integrated with a modular, intelligent, positional feedback device or encoder 50, including a processor, memory and electrical connections for sensors configured to measure temperature, current, position, force, torque, vibration and sound signals generated during operation of actuator 12. An integrated encoder/monitor module or hardware package 50 can also include a processor or microprocessor adapted to execute diagnostics operating on sensor data stored by monitor 14, with an interface to communicate system status, health parameters, and diagnostic and prognostic indicators to the user interface or higher-level control system.

Similar intelligent encoder/monitor systems 50 can be adapted for use with a motor system 34 integrated within actuator housing 32, or for independent operation with a separate servo motor or similar motor system, not necessarily connected to actuator 12. One or more load cells 60L and positions sensors 60P can also be included, e.g., absolute or incremental optical digital position encoders, magnetic or capacitive-based digital position encoders, and/or or a resolver, configured for determining rotational and linear positions and corresponding torque and force loading on selected actuator components including, but not limited to, the rotor, screw shaft, nut, thrust tube, and rod end.

Various other sensors 60T, 60C, 60V, etc. can be provided for determining temperature, current, and vibration or sound parameters (e.g., frequency and amplitude), which can be stored in the memory for use by the positional feedback device and processor. Thus, a suitable encoder 50 could also serve as the computing platform for monitor 14, executing diagnostic and prognostic monitor algorithms stored in memory, and providing a data processing platform for recoding actuator system history and component-level application parameters, with a wired or wireless communications interface to transmit the integrated sensor data, and corresponding diagnostic and prognostic indicators.

Figure 5:
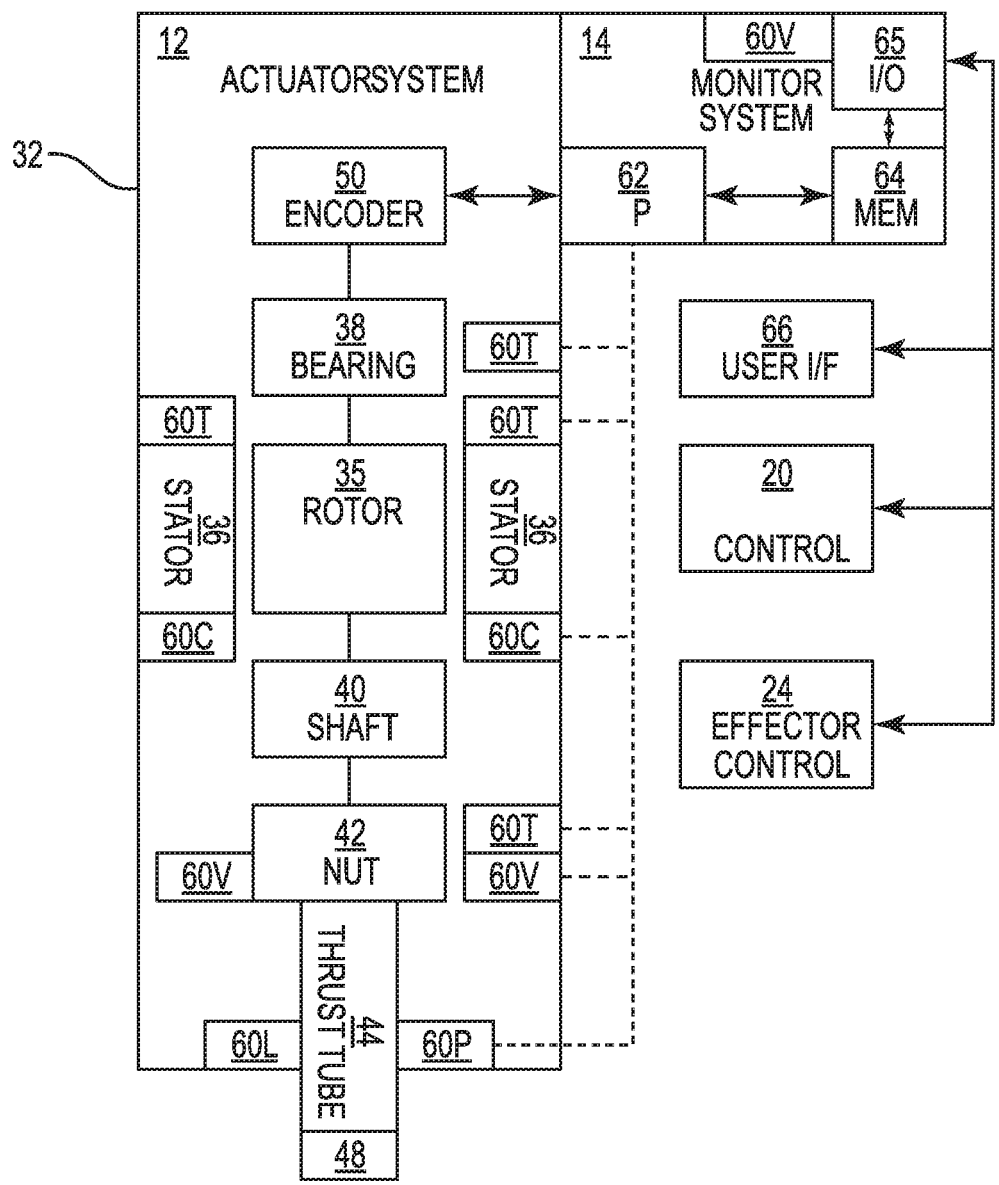
FIG. 5 is a block diagram of an actuator system with diagnostic monitoring.

FIG. 5 is a block diagram of an actuator system 12 with diagnostic monitoring system 14, e.g., a linear or rotary actuator 12 configured for robotic welding or other automated industrial process, as described herein. As shown in FIG. 5, diagnostic/prognostic (or health monitor) system 14 includes one or more sensors 60T, 60C, 60V, 60P, 60L, etc., a computer processor or microprocessor (μp) 62, memory (MEM) 64, and an input/output (I/O) interface 65 for communication with a higher-level controller or user interface (IF), e.g., a graphical user interface (GUI), robot controller 20, or weld/end effector control 22.

Monitor 14 can either be mounted to or provided within housing 32, for example in an actuator system 12 with an integrated or embedded monitor. Alternatively, monitor 14 may be remotely located, with microprocessor 62 and memory components 64 coupled to the sensors using external signal wires, or a wireless communication system. Similarly, processor 62 and memory 64 can either be provided as standalone components, or integrated with similar components in robot controller 20 or end effector control 22. In embedded configurations, processor 62 and memory 64 can be mounted inside housing 32, along with a separate digital encoder 50, or integrated with the corresponding encoder components.

Sensors 60T, 60C, 60V, 60P, 60L, etc. are capable of directly or indirectly acquiring data related to temperature, vibration, current, torque, position, force, torque, and other operational parameters for the various components of actuator system 12, including, but not limited to, motor 34, rotor 35, stator 36, bearings 38, shaft 40, nut 42 and thrust tube 44, as described herein. These include components are subject to failure under certain operating and environmental conditions, and their status is a sensitive indicator of actuator health. The corresponding sensor data thus provide valuable information, which can be used to diagnose wear, predict maintenance requirements, and reduce unscheduled downtime.

Processor 62 is configured to process data acquired by the sensors, using custom algorithms and diagnostic/prognostic indicator logic stored in memory 64 to model the operational status and health of actuator system 12, and the components thereof. Over time data indicating the motor and actuator health is tracked and stored in memory 64, and the monitor code is executed on processor 62 to generate operational histories with warnings or fault indicators for output to user interface 66, and/or a higher-level system such as robot controller 20 or end effector control 22.

Diagnostic and prognostic information generated by monitor 14 includes, but is not limited to, motor and actuator remaining service time, lubrication intervals, and overheating indicators and warnings based on rotor speed, stator current, and actuator loading. In one example, a time-averaged parameter value is generated based on the corresponding sensor data, and compared to a predetermined threshold to generate a warning or predictive maintenance indicator. Additional component-level health and status indicators can also be generated, as related to temperature, motor current, vibration, position, torque, force load and other operational parameters for the motor and stator components, and for the bearings, screw shaft, nut, thrust tube and other components of actuator system 12, as described herein.

Memory 64 is configured to store a record of lifecycle data for actuator system 12, including data from one or more thermal sensors 60T, current sensors 60C, vibration sensors 60V, position sensors 60P, load transducers 60L, etc., which are indicative of the operational and environmental conditions to which the motor, shaft, nut and other actuator system components are exposed. The lifecycle data can be integrated and displayed in histogram form, for example using an internal or external user graphical interface (or GUI) 66.

Each motor actuator device can be individually configured, using actuator motor-specific model information stored in memory 64. The specific model information can include, for example, effective remaining useful service lifetime and service intervals based on operational load and stroke data, to be used in the diagnostic and prognostic calculations and related algorithms. The lifecycle record data includes sensor data and associated parameter information and time records, along with results from the monitor code executed on processor 62 to determine the operational status of actuator system 12. In one example, the sensor data are sorted according to the amount of time actuator system 12 has been operated at the various temperatures, current levels and other operating parameters stored in memory 64, and processor 62 can predict the remaining service life for actuator system 12, and the components thereof, based on these results. Additional code can be executed to generate diagnostic and prognostic indicators, for example diagnostic indicators for component status and recommended maintenance procedures such as lubrication and repair/replacement scheduling, as well as predictive indicators or warnings for the onset of failure in one or more actuator components.

Temperature Sensors

Suitable temperature sensors 60T include thermocouples, thermistors, RTDs, IR sensors, and other temperature sensitive devices, configured to generate a sensor signal indicative of the temperate proximate the selected actuator components. Depending upon application, temperature sensors 60T may be configured to sense a number of different temperatures internal to actuator system 12, for example the temperature of nut 42 along screw shaft 40 proximate the rear (thrust) bearing 38, or an IR sensor 60T could be used to determine the temperature of nut 42 at a particular stroke position. Additional temperature sensors 60T can be provided to determine the temperature of the stator 36, e.g., at the end turn of the stator windings, where the radius of curvature is relatively high and current-temperature effects are more evident.

Current and Load Sensors

Suitable current sensors include inductive sensors, Hall sensors, and other devices configured for determining electrical current data for the actuator motor, including, but not limited to, the current in stators 36. The motor current is related to the torque or linear force output of the actuator, and thus to operational stress.

Monitor 14 is configured to observe the electrical current over time in order to count current cycles and determine frequency, and to generate an estimate of the travel distance and speed profile for thrust tube 44 and rod end 48. Monitor 14 is also configured to determine the amplitude of the current pulse, in order to estimate how much torque the motor is producing, and how much thrust or linear force the actuator delivers. Alternatively, force and torque transducers or load cell sensors 60L can be used to determine these quantities more directly.

Position Sensors

Suitable positions sensors 60P include optical encoders, magnetic encoders, linear and rotary transducers, and other devices configured for directly or indirectly determining the position of a movable portion of the actuator. Suitable position sensor data include, but are not limited to, the rotational positions of rotor 35 (or motor 34) and shaft 40, and the linear positions of nut 42, thrust tube 44 and rod end 48.

Monitor 14 is configured to observe the position of these actuator components, in order to determine the total rotational or linear travel distance. For example, rotary encoder 50 can be utilized to determine the rotational position of rotor 35 and shaft 40, from which the linear position of nut 42, thrust tube 44 and rod end 48 can be determined. Alternatively, a linear transducer can be positioned to determine the position of nut 42 along screw 40, and one or both of thrust tube 44 and rod end 48 can be encoded for direct measurement using an optical or magnetic encoder.

Monitor 14 is also configured to combine position and current or force/torque data, in order to determine how much work is performed during each actuator cycle. Integrating these data over time, monitor 14 can determine the velocity and acceleration of the relevant motor actuator components. These data are used to determine the total accumulated operational load, and to estimate wear estimates for selected actuator components, including, but not limited to, screw shaft 40, nut 42, and other service-life limited mechanical elements. These data are in turn utilized to estimate the remaining service life or actuator system 12, before a scheduled maintenance operation is indicated.

Vibration Sensors

Suitable vibration sensors 60V include accelerometers and force or velocity transducers configured to determine the amplitude and frequency of vibration for selected actuator components, including, but not limited to, rotor 35, shaft 40, nut 42. Vibration sensors 60V can also be used to determine the vibration amplitude and frequency via coupling to housing 32, either directly or by mounting to electronic components within housing 32 (e.g., on a processor or memory board in monitor 14 or encoder 50). Alternatively, an acoustic or optical vibration sensor 60V can be used to determine the vibrational signature based on an audio or optical signal, with sensor placement either interior or exterior to housing 32.

Monitor 14 is configured to determine vibration signatures including both the frequency and energy spectrum of the vibration data, and to use the signatures to identify mechanical components that generate negative health indicators for actuator system 12. More specifically, changes in the vibration signature over time may indicate wear on different mechanical components of actuator 12, which can be utilized to generate prognostic failure indicators or warnings indicating the onset of failure in specific components, and to generate corresponding maintenance warnings or flags.

Diagnostics and Prognostics

FIG. 6 is a block diagram illustrating method 70 for diagnostic monitoring of an actuator system, for example a motor actuator system 12 with a diagnostic and prognostic module or hardware package 14, as described herein. As shown in FIG. 6, method 70 comprises one or more steps including, but not limited to, sensing operational conditions and environmental parameters of the actuator components (step 72), processing the sensor data (step 73), storing the (raw and/or processed) sensor data (step 74), integrating the data over time (step 76), and output, communications, and display of the data (step 78). In addition, method 70 may also include one or more steps of generating diagnostic indicators (step 80), generating prognostic indicators (step 82), and communication of recommended maintenance warnings, flags and other indicators (step 84). These steps may be performed in different orders and combinations, suitable to providing diagnostic and prognostic indicators for actuator health and operational status, and to recommending specific maintenance actions, as described herein.

Sensing data (step 72) includes acquiring sensor data related to environmental conditions and operational loading on the actuator system. Suitable sensor data include, but are not limited to, temperature, current, load, position and vibration data, any of which can be obtained either directly or indirectly from the corresponding actuator components, e.g., utilizing one or more temperature sensors, current sensors, load cells, vibration sensors and position sensors, as described herein.

Processing the sensor data (step 73) is performed to convert the sensor signals (or other sensor data) into useful output including derived parameters such as temperature, current, load and position information, etc., which represent the operational status and environmental conditions of the motor actuator. Typically, the processing step includes using a look-up table or calibration data (or both) to convert the raw sensor output (e.g., in the form of an analog or digital sensor signal) into a useful record of operational data (e.g., digital data or other information representing the relevant conditions and operational parameters, as a function of time).

Data storage (step 74) includes storing the raw sensor data and derived parameters or other operational information in memory, for example utilizing one or more memory components 64 in either an integrated (internal) or modular (external) diagnostic monitor 14. In addition to the raw data acquired by the sensors, derived data representing the corresponding operational and environmental parameters and vibrational signatures are also stored to build an operational record or operational history of the motor actuator over time, for example using storage and processing criteria as determined by software monitor code and related algorithms executing on a suitable processor or microprocessor 62.

Data integration (step 76) includes summing, binning, adding, and otherwise integrating or accumulating the stored data over time. Changes in the environmental parameters and operational conditions can also be generated, including changes in the vibrational signatures of selected actuator components, as obtained over extended periods of days, hours, weeks, months and years of actuator cycles. The integrated data (and changes in the integrated data) are also stored in memory (step 74).

Output (step 78) includes communicating and displaying any of the raw sensor data, the derived environmental and operational parameters, the integrated data, and the vibrational signatures, for example in the form of a histogram or other integrated data summary on a standalone user interface 66, or via communications to a robot control 20 or higher-level end effector control 22, as described above. Changes in the data can also be communicated, including changes in the sensor data or derived environmental conditions and operational parameters observed over time, changes in the integrated data summaries, and changes in the vibrational signatures (e.g., changes in the frequency or amplitude spectra).

Output (step 78) also includes communications to an external user or process control system, for the purpose of transmitting status, health, and diagnostic and prognostic information related to actuator operation. In addition, the communications can also allow the user or process control system to configure the actuator and monitor with information for additional diagnostic and prognostic calculations. This information typically relates to motor actuator specifications, and may include proprietary and non-proprietary component-level statistics and other application data used to generate actuator status reports, predict and diagnose potential system and component failures, estimate the remaining service lifetimes, and generate maintenance flags indicating substantial wear or the onset of failure in selected motor and actuator components.

Generating diagnostics (step 80) includes status indicators of actuator health and component status based on the environmental and operational parameters, and on the integrated sensor data representing accumulated operational stress. Generating prognostics (step 82) includes predictive indicators for the onset of component failure and other potential maintenance events, based on the integrated sensor data, the vibrational signatures, and changes therein.

Generating indicators (step 84) includes recommended maintenance procedures, for example to avoid potential component failures and reduce unscheduled downtime, as described above. The various indicators and flags generated in steps 80, 82 and 84 can also be stored in the actuator monitor database (step 74), and displayed or otherwise communicated to a user or process control system (step 78). More generally, method 70 can be performed as an iterative process, in which the individual steps of sensing environmental parameters and operational conditions (step 72), data storage (step 74), data integration (step 76), and communication and display (step 78), are performed in a range of suitable orders and combinations, in order to develop better diagnostics (step 80) and prognostics (step 82), and provide improved predictive maintenance flags and other indicators (step 84) to reduce unanticipated downtime and increase the useful service life of the overall actuator system.

Model and Condition-Based Monitoring

Two broad categories of model-based and condition-based analysis can be utilized to generate diagnostics (step 80) and prognostic indicators (step 82). In turn, both categories of status indicator can be utilized to generate maintenance flags and warnings (step 84).

In a model-based approach, the number of strokes and cumulative torque and force loading are integrated to determine the total work performed by the actuator system, and compared to a real-time operational model for a given actuator configuration and environmental conditions (e.g., system and component temperatures). Additional operational parameters such as stroke speed, repetition rate, maximum stroke length and total current delivered per stroke can also be included, in order to estimate the remaining service lifetime before a re-greasing (lubrication) operation or other preventive maintenance is scheduled.

While the accumulated number of strokes and integrated motor current may be considered key indicators of the total work performed, model-based dynamic load response calculations and other, more advanced metrics are also encompassed. These diagnostic metrics can also account for dynamic loading and real-time environmental conditions, including grease and component temperatures. This approach offers substantial advantages over a simple time-based or stroke-count based maintenance program, and provides a more complete history of actuator system operations. As a result, the maintenance flags can be more timely and more detailed, and more specifically directed to particular actuator components such as screw shaft or nut, motor maintenance, and other recommended service operations.

In a model-based approach, each individual motor actuator device can have model-specific empirical data stored in memory 64, for use in the diagnostic and prognostic calculations. These data can be configured for the specific motor actuator hardware and range of operational conditions, so that the empirical data may be compared to actual operational data and other information derived from the sensor signals, in order to determine useful diagnostic and prognostic indicators. Suitable examples include, but are not limited to, indicators of remaining useful service life or a fraction thereof (e.g., end of predicted useful service life or halfway through the useful service life), and similar service indicators (e.g., lubrication service intervals) based on operational conditions including the integral of the stoke distance and load (or work done), as well as temperature, current, vibration, and other sensor information.

In the condition-based category, the vibration signature, temperature profile, and other operational conditions can also be used to diagnose the health condition of specific actuator components, and to predict the onset of failure before an actual downtime event occurs. More particularly, changes or shifts in the vibrational signature may indicate wear or fatigue in the screw shaft, nut, or other actuator components, when subject to a given set of operation conditions (e.g., at a given shaft speed and loading). Similarly, changes in the operational temperature for a given current pulse and shaft loading may also indicate a recommended maintenance action, independent of those suggested by the model-based (accumulated load) approach.

The vibration signature from an accelerometer or other motion sensor can be analyzed using a fast Fourier transform (FFT) or other suitable algorithm, adapted to detect shifts in either the amplitude or frequency of the vibrational signal. Similar algorithms can be used to detect changes in the signal from an audio transducer or other audio-frequency device, either independently of or in combination with a motion-based vibration analysis. Frequency and amplitude analysis can also be applied to other sensor outputs, including a frequency-response analysis of the motor drive current, as well as frequency and amplitude analysis of the corresponding load cell and linear or rotary encoder outputs. Other suitable algorithms applicable to any of the sensor signals include wavelet transforms, high-pass, low-pass, and narrow-pass frequency filtering, polynomial curve fits, spline fits, and projections based on first, second and higher-order differentials. The results of these fitting and filtering algorithms can used to generate maintenance flags and diagnostic/prognostic indicators based on simple threshold functions and time predictions, by looking for changes or differences with respect to a set of modeled or reference values, or by integrating the results and comparing to a predicted integrated maintenance standard (e.g., time integrated motor current, torque input, linear stroke, etc.). The indicator functions can also be normalized to a particular reference temperature, e.g., by scaling each entry based on a difference between the actual operating temperature and a standard reference temperature, or simply compared to corresponding functions modeling nominal operating modes and known failure modes of the system.

EXAMPLES

A diagnostic actuator system can be provided, either entirely internal to a linear actuator, or combined with an integrated motor actuator and able to perform diagnostics and prognostics by taking data from on-board and/or external sensors and analyzing the data to generate actuator system status and health indicators, using algorithms stored in memory and executed in an on-board computing device or other processor component. The algorithms can use application data stored in the device memory, representing known system capabilities, normal operating modes, and system failure modes. The system can communicate the current status and health indicators of the integrated motor actuator to a higher-level monitor, which could be, e.g., the actuator's main controller, a user interface, or a system-level device such as a robot controller.

Example 1

The system may comprise one or more sensors capable of directly or indirectly acquiring data related to temperature and other operational conditions of critical components of the actuator. The critical components of the actuator may include components that have a relatively high risk (or the highest risk) of failure during actuator operations, and/or components whose health is relatively sensitive (or most sensitive) to temperature. Failure of such components can be catastrophic for the motor actuator, and the sensor data therefore provide valuable information regarding motor actuator and component health.

Example 2

The system may comprise one or more sensors capable of acquiring the actuator motor's electrical current data. The motor's electrical current is directly or indirectly linked to how much stress is on the actuator, e.g., operational torque or force loading. By observing the electrical current over time, it is possible to count current cycles to obtain an estimate for travel distance of the thrust rod or other actuator component. By observing the amplitude of the current, it is possible to estimate how much torque the motor is producing, and how much thrust the actuator is delivering to the rod end or other application. By observing the frequency of the current, it is also possible to obtain an estimate for the speed of selected actuator components, e.g., the rotor, screw, thrust tube, and rod end.

Example 3

The system may comprise one or more sensors capable of directly or indirectly acquiring the position of a movable portion or movable components of the actuator. By observing the position of these integrated motor actuator components, it is possible to determine the total travel distance, and, when combined with data for the motor current, to determine how much work is done while the actuator components are in motion. When combining this data with time information, e.g., by integrating the accumulated current, position and/or loading data, it is possible to determine the velocity and acceleration of the moving motor actuator components. These data can be used to calculate wear, including wear on key system components which can be used to determine a remaining service life for the actuator system, and to recommend diagnostic and prognostic maintenance actions accordingly.

Example 4

The system may comprise one or more sensors capable of acquiring data related to vibration. Vibration can be one of the first signs of wear or potential failure (or the onset thereof) for many of the mechanical components integral to the motor actuator. By observing the frequency and energy of vibration, it is possible to identify specific mechanical components that are contributing negatively to the health of the actuator. An acoustic sensor can be used as an alternative to the accelerometer, optical motion sensor, or other vibration sensor.

Example 5

The system may be embedded with the motor actuator, and include some form of memory so that the processor can create and maintain a record of lifecycle data representing time periods in which the motor actuator has been operated. The lifecycle data may be generated and/or displayed in a histogram or other integrated format (e.g., by sorting the amount of time that the actuator system has been operated at various current levels and temperatures, or other operating and environmental parameters). The lifecycle record may contain any or all of the sensor input data, as well as associated timing data and any processing information used to determine actuator status, remaining service life, and the diagnostics and prognostics related to recommended maintenance, actual and predicted component failures, and other real or potentially catastrophic events.

Example 6

The system may include a microprocessor configured to execute software code to process the data acquired by the sensors, using custom algorithms stored in memory in order to model the actuator system status. Over time, the motor actuator health can be tracked and the processor can be configured to alert a user or higher-level monitoring system with warnings of critical faults related to component status. Some information created by the diagnostic and prognostic algorithms may relate to the motor actuator's remaining usable service life, lubrication intervals, overheating due (e.g.) to high time-average shaft or rotor speed, overheating due to high time-average current, and/or specific component-level health and status indicators.

Example 7

The system may provide communications to an external user or process control system for the purpose of transmitting actuator status information, component health indicators, and/or prognostic information related to potential component failure or recommended maintenance events. The communication protocol can also allow the external user or control system to configure the system with application information necessary for selected diagnostic and prognostic calculations.

Example 8

The system may comprise memory configured for storing the integrated motor actuator specifications, proprietary component level statistics, and/or application information that can be used to generate status indicators, diagnose potential component or system failures, predict failure (or the onset thereof) for components within the motor actuator, and/or estimate the remaining useable service life of the integrated motor actuator system.

Example 9

The system may be comprised of a modular intelligent positional feedback device that includes electrical input connections for other sensors measuring physical and operational parameters such as temperature, current, and vibration or sound. The positional feedback device could include an on-board computer or processor component that is able to execute the diagnostic algorithms described above, and communicate system status information and health indicators to a higher-level controller.

An intelligent encoder can be used on any of the above motor systems integrated with a linear actuator, or on the motor system by itself, without being connected to a linear actuator. Such a feedback device could also include an absolute or incremental optical digital position encoder, a magnetic or capacitive-based digital position encoder, and/or a resolver for determining position. One or more sensors for temperature, current, and vibration or sound could connect into the positional feedback device, which would also serve as the computing platform for executing the diagnostic and prognostic algorithms, as well as a data storage platform for storing system history and device and application parameters, and a communications device configured to send corresponding data and messages to the higher-level monitor.

ADDITIONAL EXAMPLES

Depending upon application, a diagnostic system for a motor actuator may include a plurality of sensors configured for acquiring data related to operational conditions of the motor actuator, a processor configured for analyzing the data to determine an actuator system status of the motor actuator, and memory for storing the data with algorithms or code modules executable on the processor to determine the status. The algorithms can represent indicators based on system capabilities, normal operating modes, and failure modes of the motor actuator, e.g., wherein the system is configured to communicate the status to a user interface or controller for the motor actuator.

In some examples of such a diagnostic system, at least one of the sensors is configured to acquire data related to temperature of a component of the motor actuator. The status can then be provided for indicating a health status of the component, based on the temperature in comparison to the normal operating modes, or the status can be predictive of failure of the component, based on the temperature in comparison to at least one of the failure modes.

At least one of the sensors can be configured to acquire data for a motor current linked to stress on the motor actuator, with at least one of the algorithms or code modules executable on the processor to estimate a travel distance for a thrust rod of the actuator based on a count of cycles of the motor current, to estimate a torque or thrust produced by the actuator based on an amplitude of the motor current, or to estimate a speed of the thrust rod based on a frequency of the motor current. In such systems, the status may indicate accumulated stress on the actuator, based on the motor current as compared to the normal operational modes. The status can also be predictive of failure of the actuator, based on the motor current (or integrated motor current) in comparison to a corresponding value of the motor current for at least one of the failure modes.

At least one of the sensors can be configured to acquire data for a position of a movable portion of the motor actuator (e.g., a thrust rod), with at least one of the algorithms being executable on the processor to determine a travel distance of the movable portion based on the position, determine work done by the actuator based on the travel distance in combination with the data for the motor current, or to determine one or both of a velocity and an acceleration of the movable portion, based on the data for the position in combination with associated timing data characterizing the position as a function of time. In these examples, the status may indicate wear on a particular component of the motor actuator, based on at least one of the travel distance, the work done, the velocity and the acceleration.

At least one of the sensors can be configured to acquire data relating to vibration of a mechanical component of the motor actuator, for example with the status indicating wear on the mechanical component based on a frequency or amplitude of the vibration as compared to the normal operational modes, or with the status being predictive of failure of the mechanical component based on a frequency or amplitude of the vibration in comparison to at least one of the failure modes. In these examples, at least one sensor can comprises an acoustic sensor configured to acquire the data as an audio signal relating to vibration of the mechanical component.

The processor and memory can be embedded or integrated within the motor actuator, and the memory can be configured for the processor to create and maintain a lifecycle record of cycles in which the motor actuator has operated. Such a lifecycle record can be provided in histogram form, with bins sorting the time that the motor actuator has operated at various motor current levels and temperatures, or the lifecycle record can contain the data acquired by the sensors, associated time data and processing information used to determine the status. The status can indicate an estimated remaining service life of the motor actuator, or the status can be predictive of a failure event for the motor actuator.

The processor can be configured to process the data acquired by the sensors using the algorithms or code modules to model the motor actuator system status and track health of the motor actuator over time, or to alert the user interface or controller with warnings or critical fault information. Suitable alerts, warnings an critical fault information can be selected from a motor actuator remaining usable service life, a lubrication interval, overheating due to high time average speed, overheating due to high time average current, and specific component-level health and status.

The status communicated to the user interface or controller can include transmitted health or prognostic information (or both) based on application information used to configure the system for diagnostic and prognostic calculations. In these examples, the application information may comprise one or more specifications for the motor actuator and component-level statistics used to generate the status, diagnose component or system failures of the motor actuator, predict failure of components within the motor actuator, or estimate a remaining useable service life of the motor actuator.

A modular intelligent positional feedback device can be provided with electrical input connections for one or more sensors configured to acquire data related to physical actuator parameters selected from component temperature, motor current, vibration of the motor actuator and sound emitted by the motor actuator. The positional feedback device can comprise an encoder including an on-board computer comprising the processor configured to execute the algorithms stored in the memory, and also to communicate the status to the user interface or controller.

Such a system can comprise one or more of an absolute or incremental optical digital position encoder, a magnetic or capacitive-based digital position encoder, or a resolver for determining a position of a movable element of the motor actuator (e.g., a thrust tube). One or more of the sensors configured to acquire the data may connect into the positional feedback device, where the device is operable as one or more of a computing platform for executing the algorithms, a data storage platform for storing an operational history for the device and application parameters of the motor actuator, or a communication device to send messages communicating the status to the user interface or controller.

Suitable systems may include a motor configured to operate an actuator, one or more sensors configured to determine one or more of a component temperature, motor current, vibrational state, component position, and component loading for the actuator, and a processor configured to generate a status indicator for the actuator based on data from the one or more sensors, as described herein. Such a system may include memory configured for storing an operational model of the actuator, the operational model including specifications for the actuator and component-level statistics as a function of the data from the one or more sensors. In some examples, the processor is further configured to generate the status indicator based on comparison of the data from the one or more sensors to the operational model.

Such a processor can be configured to estimate cumulative work done by actuator from the motor current, and to generate the status indicator as an estimated interval to a recommended service operation, based on the cumulative work and the operational model of the actuator. The processor can further be configured to modify the estimated interval, based on the component temperature.

The processor can be configured generate the status indicator as prognostic of component failure, based on a frequency or amplitude of the vibrational state of the component. In some of these examples, the processor may be further configured to generate the prognostic as an indicator of component failure based on a change in the frequency or amplitude of the vibrational state of the component.

The motor can be configured to drive a screw shaft and nut assembly into relative rotation about an axis of the actuator, where the actuator is configured to drive a thrust tube in reciprocal motion along the axis in response to the relative rotation of the screw shaft and nut assembly. One or more of the sensors can include at least one current sensor configured to determine the motor current provided to the motor in operating the actuator to cycle the thrust tube in the reciprocal motion along the axis if the actuator, e.g., where the at least one current sensor is selected from an inductive sensor or a Hall sensor.

One or more of the sensors may include at least one position sensor configured to determine a position of the thrust tube along the axis of the actuator, where the position sensor is selected from an optical encoder, an optical digital encoder, a magnetic encoder and a capacitive encoder. One or more of the sensors may include at least one load cell configured to determine torque or force loading on the actuator, where the processor is configured to generate the status indicator based on a time integral of the torque or force loading.

One or more of the sensors may include at least one temperature sensor proximate one or more of the nut and a thrust bearing at a distal end of the screw shaft, opposite the thrust tube, with the at least one temperature sensor selected from a thermocouple, a thermistor, a resistance temperature detector and an infrared sensor. One or more of the sensors can also include at least one vibration sensor proximate one or more of the nut, the processor, and a housing of the actuator, the at least one vibration sensor being selected from an accelerometer, an optical motion sensor and an acoustic sensor.

Memory can be provided in signal communication with the one or more sensors, and configured for storing software modules or algorithms for execution on the processor to generate the status indicator. In some such examples, the processor and memory are provided in modular form and coupled to a housing of the actuator or motor. Alternatively the motor and actuator can be provided as an integrated motor actuator with the processor and memory provided within a housing of the integrated motor actuator, or the actuator may comprise an encoder with the processor and memory integrated or combined with the encoder in a common housing.

Suitable methods of operating such systems include one or more steps of sensing operational conditions of an actuator system, storing sensor data representing the operational conditions, integrating the sensor data over time, generating a diagnostic indicator based on the integrated sensor data in comparison to an operational model of the actuator system, generating a prognostic indicator based on changes in the integrated sensor data in comparison to a set of condition-based criteria in the operational model, and communicating at least one of the diagnostic and prognostic indicators to a user interface or process control device configured to operate the actuator system. The steps may also include communicating a recommended maintenance action for the actuator system based on at least one of the diagnostic and prognostic indicators, as described herein.

A diagnostic system utilizing such methods typically includes a plurality of sensors configured for acquiring data related to operational conditions of a motor actuator, a processor configured for analyzing the data to determine a status of the motor actuator, and memory for storing software executable on the processor to determine the status. The software can be executed to represent system capabilities, normal operating modes, and failure modes of the motor actuator, and the system can be configured to communicate a corresponding status indicator to a user interface or higher-level controller.

While this invention has been described with reference to exemplary embodiments, it will be understood by those skilled in the art that various changes can be made and equivalents may be substituted without departing from the spirit and scope thereof. Modifications may also be made to adapt these teachings to other applications and to particular problems, technologies, and materials, without departing from the essential scope thereof. The invention is thus not limited to the particular examples that are disclosed, but encompasses all embodiments falling within the scope of the appended claims.

The invention claimed is:

1. A motor actuator system comprising:
   a motor configured to drive a screw shaft and nut assembly into relative rotation about an axis;
   a thrust rod coupled to the nut assembly, the thrust rod configured to execute reciprocal motion along the axis in response to the relative rotation;
   one or more sensors configured to acquire sensor data characterizing operational conditions of the motor actuator system, wherein the operational conditions comprise a position of the thrust rod along the axis, a motor current delivered to the motor, and a component temperature of the motor actuator system;
   memory configured for storing model data representative of the operational conditions for normal operating modes and failure modes of the motor actuator system;
   a processor configured to generate a status indicator based on analysis of the operational conditions characterized by the sensor data with respect to the model data, wherein the processor is further configured to determine a travel distance of the thrust rod based on the position and to determine work done by the actuator system based on the travel distance and the motor current delivered to the motor, wherein the status indicator is representative of wear on a component of the motor actuator system based on the travel distance and the work done; and
   an interface configured to communicate the status indicator to a control device configured for operating the motor actuator system, wherein the status indicator is further representative of the component temperature in relation to at least one of the normal operating modes and predictive of component failure based on the component temperature in relation to at least one of the failure modes.

2. The system of claim 1, wherein the processor is configured to estimate one or more of:
   torque or thrust produced by the actuator system based on an amplitude of the motor current; and
   speed of the thrust rod based on a frequency of the motor current; and
   wherein the status indicator is representative of stress on the actuator system based on the motor current in relation to at least one of the normal operational modes and predictive of component failure based on the motor current in relation to at least one of the failure modes.

3. The system of claim 1, wherein the processor is configured to determine one or more of:
   velocity or acceleration of the thrust rod based on the position in combination with corresponding timing data; and
   wherein the status indicator is further representative of wear on a component of the motor actuator system based on at least one of the velocity and the acceleration.

4. The system of claim 1, wherein:
   at least one of the sensors is configured to acquire the sensor data characterizing mechanical vibration of a component of the motor actuator system, the status indicator being representative of wear on the component based on a frequency or amplitude of the vibration in relation to at least one of the normal operational modes and alternately predictive of failure of the mechanical component based a change in the frequency of the vibration in relation to at least one of the failure modes.

5. The system of claim 1, wherein the processor and memory are integrated with a housing of the motor actuator system and the memory is configured to store a record of operation thereof, the record comprising:
   data for time periods the motor actuator system operates at the motor current levels delivered to the motor and the respective component temperature of the motor actuator system; and
   at least a portion of the sensor data acquired by the sensors with associated timing data and information used to determine the status indicator;
   wherein the status indicator is representative of an estimated remaining service life of the motor actuator system and alternately predictive of a failure event for the motor actuator system.

6. The system of claim 1, wherein the processor is configured to analyze the sensor data acquired by the sensors using one or more algorithms selected to generate the model data and track health of the motor actuator system over time, the processor further configured to generate health and status warnings or component-level fault information selected from:
   a remaining usable service life of the motor actuator system;
   a lubrication interval for the motor actuator system;
   overheating of the motor actuator system due to high time average speed of the motor; and
   overheating of the motor actuator system due to a high time average of the motor current delivered to the motor.

7. The system of claim 1, wherein the status indicator further comprises health or prognostic information based on application data used to configure the system for diagnostic and prognostic calculations, the application data comprising specifications for the motor actuator system and component-level statistics used to generate the status indicator and for one or more of:
   diagnosing component or system failures of the motor actuator system;
   predicting failure of components within the motor actuator system; and
   estimating a remaining useable service life of the motor actuator system.

8. The system of claim 1, further comprising:
   a positional feedback device having electrical input connections for one or more of the sensors configured to acquire the sensor data characterizing the operational conditions, wherein the sensor data characterize the operational conditions based on one or more physical parameters selected from component temperatures, motor currents, mechanical vibrations and sounds emitted by the motor actuator system;
   wherein the positional feedback device comprises an encoder comprising the processor, and wherein the processor is configured to execute one or more algorithms stored in the memory to generate the status indicator communicated to the control device.

9. The system of claim 1, further comprising a positional feedback device comprising one or more of an absolute or incremental optical digital position encoder, a magnetic or capacitive-based digital position encoder, or a resolver, wherein the positional feedback device is configured for determining a position of the thrust rod and further being operable as a computing platform for executing one or more algorithms stored in the memory to generate the status indicator.

10. The system of claim 9, wherein the positional feedback device is further configured as a data storage platform for storing an operational history comprising device and application parameters for the motor actuator system, and as a communication interface configured to send messages communicating the status indicator to the control device.

11. A system comprising:
   a motor configured to operate an actuator;
   one or more sensors configured to generate sensor data to determine a motor current and one or more of a component temperature, vibrational state, component position, and component loading of the actuator;
   memory configured for storing an operational model of the actuator, the operational model including specifications for the actuator and component-level statistics as a function of the sensor data generated by the one or more sensors; and
   a processor configured to generate a status indicator for the actuator based on comparison of the sensor data generated by the one or more sensors to the operational model of the actuator;
   wherein the processor is configured to estimate cumulative work done by the actuator from the motor current and to generate the status indicator as an estimated interval to a recommended service operation based on the cumulative work and the operational model of the actuator; and
   wherein the processor is further configured to modify the estimated interval based on the component temperature.

12. The system of claim 11, wherein:
the processor is configured generate the status indicator based on a frequency or amplitude of the vibrational state in comparison to the operational model of the actuator; and
the processor is further configured to generate the status indicator as a prognostic of component failure based on a change in the frequency of the vibrational state in comparison to the operational model of the actuator.

13. The system of claim 11, further comprising a screw shaft and nut assembly configured for relative rotation about an axis of the actuator, wherein the motor is configured to cycle a thrust tube in reciprocal motion along the axis in response to the relative rotation of the screw shaft and nut assembly.

14. The system of claim 13, wherein at least one of the sensors comprises a current transducer configured to determine the motor current as provided to the motor in operating the actuator to cycle the thrust tube in the reciprocal motion along the axis, the current transducer being selected from an inductive sensor or a Hall sensor.

15. The system of claim 13, wherein at least one of the sensors comprises:
a position transducer configured to determine a position of the thrust tube along the axis of the actuator, the position transducer selected from an optical encoder, an optical digital encoder, a magnetic encoder and a capacitive encoder; or
a load cell configured to determine a torque or force component of the component loading, the processor being configured to generate the status indicator based on a time integral of the torque or force component.

16. The system of claim 13, wherein at least one of the sensors comprises:
a temperature transducer proximate one or more of the nut and a thrust bearing at a distal end of the screw shaft opposite the thrust tube, the temperature transducer selected from a thermocouple, a thermistor, a resistance temperature detector and an infrared temperature sensor; or
a vibration detector proximate one or more of the nut, the processor, and a housing of the actuator, the vibration detector selected from an accelerometer, an optical motion sensor and an acoustic sensor.

17. The system of claim 11, further comprising one or more software algorithms stored in the memory for execution on the processor to generate the status indicator based on the comparison of the sensor data to the operational model of the actuator, wherein the processor and memory are provided in modular form and coupled to a housing of the actuator or motor.

18. The system of claim 11, wherein the motor and actuator are provided in an integrated motor actuator housing and further comprising an encoder or resolver having the processor and memory configured for estimating the cumulative work and generating the status indicator, wherein the processor and memory are integrated or combined with the encoder or resolver within the integrated motor actuator housing.

19. A method comprising:
sensing operational conditions of an actuator system;
storing sensor data representing the operational conditions;
integrating the sensor data over time, wherein the integrated sensor data comprise integrated motor current and positional data for the actuator system;
estimating cumulative work delivered by the actuator system as a function of the integrated motor current and positional data;
generating a diagnostic indicator based on the integrated sensor data in comparison to an operational model of the actuator system;
generating a prognostic indicator based on changes in the integrated sensor data in comparison to a set of condition-based criteria in the operational model, the condition-based criteria characterizing a vibration signature and component temperature and loading profiles for the actuator system;
communicating at least one of the diagnostic and prognostic indicators to a user interface or process control device configured to operate the actuator system;
wherein the prognostic indicator comprises a recommended maintenance interval for the actuator system based on the cumulative work; and
further comprising modifying the recommended maintenance interval responsive to at least one of the component temperature and loading profiles.

20. The method of claim 19, further comprising determining a change or shift in the component temperature and loading profiles responsive to the cumulative work delivered by the actuator system, wherein the diagnostic indicator is indicative of the change or shift in the component temperature profile, and wherein the prognostic indicator is indicative of the change or shift in the component temperature profile with respect to the loading profile.

21. The method of claim 19, wherein the sensor data comprise mechanical vibration data for a component of the actuator and further comprising determining a change or shift in the vibration signature based on the vibration data, wherein the prognostic indicator comprises a recommended maintenance action or failure warning responsive to the change or shift in the vibration signature with respect to one or both of the component temperature and loading profiles.

22. The method of claim 19, wherein the actuator system comprises a motor and actuator provided in an integrated motor actuator housing with an encoder or resolver having a processor and memory configured for estimating the cumulative work and generating the diagnostic and prognostic indicators, and wherein the processor and memory are integrated or combined with the encoder or resolver within the integrated motor actuator housing.

* * * * *